April 29, 1941.  J. M. WOLFSKILL  2,240,453
PIEZOELECTRIC CRYSTAL APPARATUS
Filed July 1, 1940   3 Sheets-Sheet 1
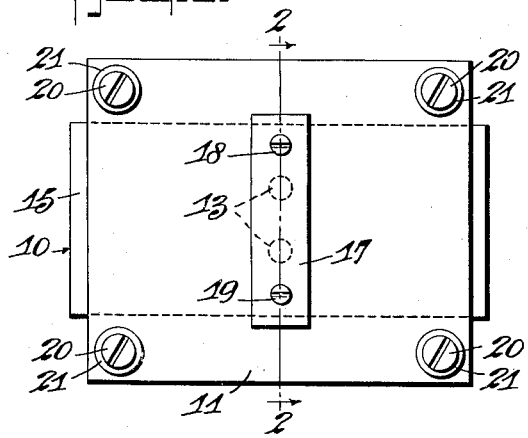
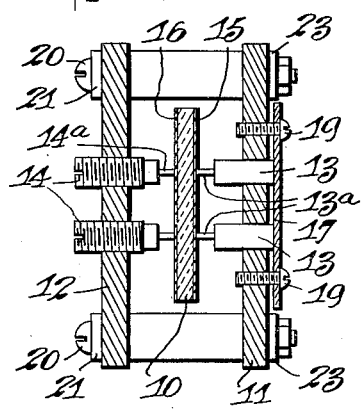
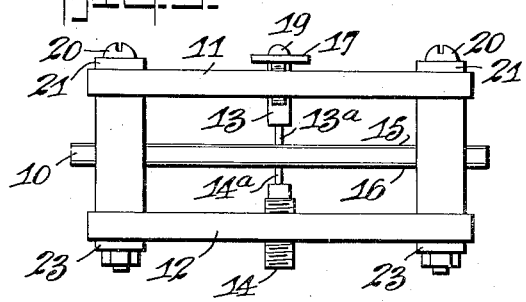
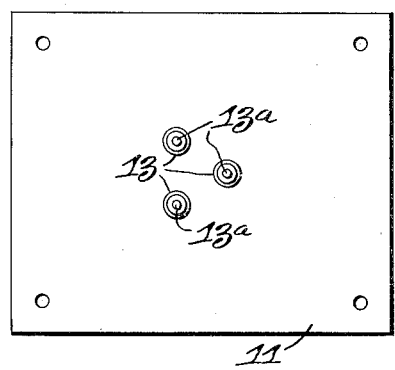
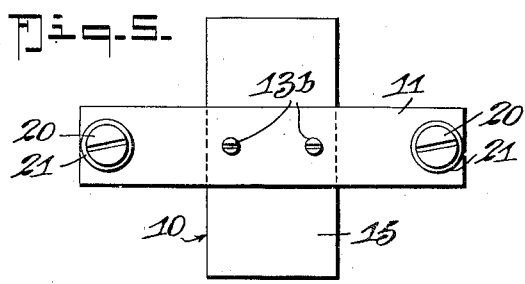
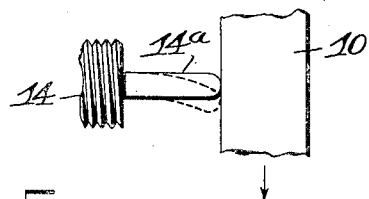
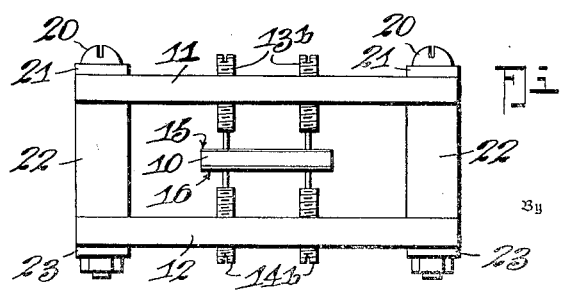
Inventor
J. M. Wolfskill.

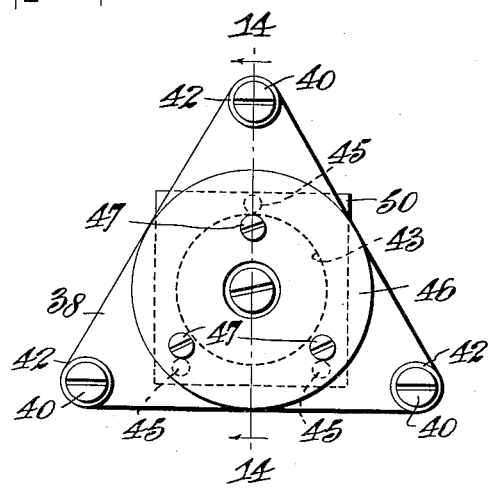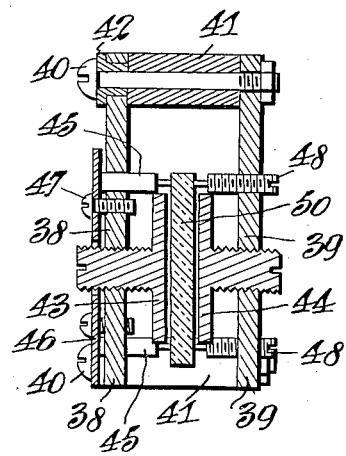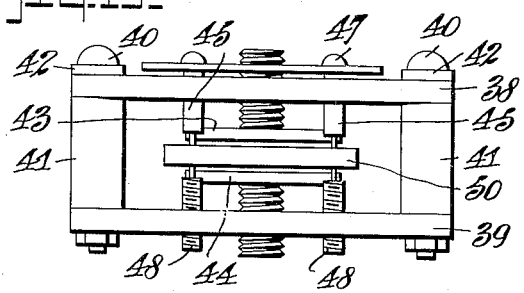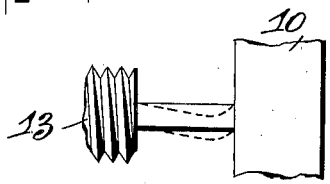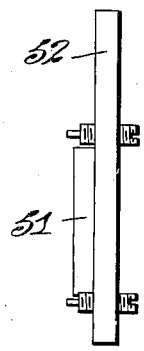
Inventor
J. M. Wolfskill.

April 29, 1941.  J. M. WOLFSKILL  2,240,453
PIEZOELECTRIC CRYSTAL APPARATUS
Filed July 1, 1940   3 Sheets-Sheet 3
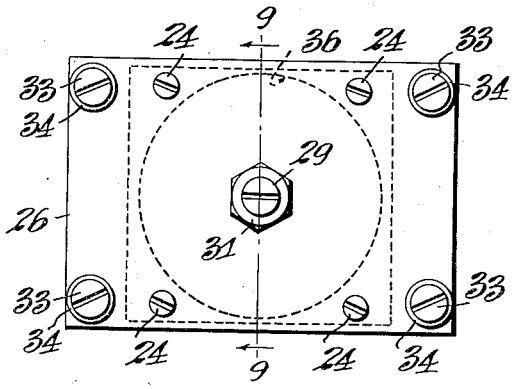
Fig. 8.
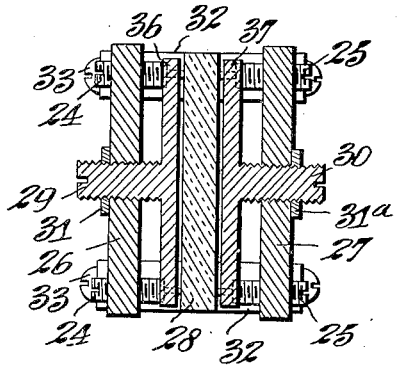
Fig. 9.
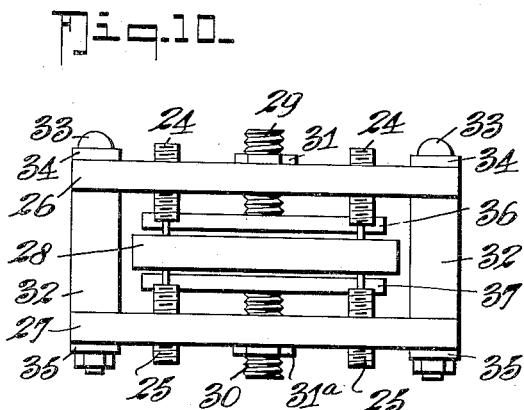
Fig. 10.
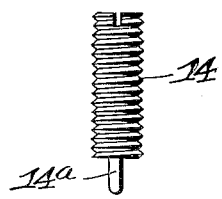
Fig. 11.
Fig. 12.
Fig. 18.  Moment of Inertia $I = \dfrac{WT^3}{12}$
Fig. 19.  Moment of Inertia $I = \dfrac{\pi D^4}{64}$
Inventor
J. M. Wolfskill.
By Ben. J. Chromy.
Attorney Patented Apr. 29, 1941

2,240,453

UNITED STATES PATENT OFFICE 2,240,453

PIEZOELECTRIC CRYSTAL APPARATUS

John M. Wolfskill, Erie, Pa., assignor to Bliley Electric Company, Erie, Pa., a partnership composed of F. Dawson Bliley and Charles Collman Application July 1, 1940, Serial No. 343,468

20 Claims. (Cl. 171—327)

This invention relates to piezoelectric crystal apparatus in general. More particularly this invention relates to a method and apparatus for mounting piezoelectric crystals in such a way that they are rigidly supported without having the crystal characteristics affected by the clamping or mounting means.

An object of this invention is to provide a mounting or holder for piezoelectric crystals in which the crystal is clamped rigidly between a supporting point or supporting points so that its position will be maintained regardless of the vibration of the crystal or any slight jars or vibration to the holder proper.

Another object of this invention is to provide a mounting or holder for piezoelectric crystals in which the crystal may be rigidly clamped without in any way affecting its piezoelectric activity.

Still another object of this invention is to provide a mounting or holder for piezoelectric crystals in which the crystal is clamped independently of the electrodes which energize the piezoelectric element.

A further object of this invention is to provide a piezoelectric crystal holder or mounting in which resonant clamping means are employed for supporting the crystal rigidly.

Another object of this invention is to provide a holder or mounting for piezoelectric crystals in which clamping means is employed which does not affect the piezoelectric activity or other characteristics of the crystal element, regardless of whether the crystal is clamped at a nodal point or on a nodal line or not.

Still another object of this invention is to provide a method of slight frequency adjustment in piezoelectric crystals by varying the pressure on the clamping means.

Another object of this invention is to provide a mounting for piezoelectric crystals in which the frequency may be adjusted by varying one or both electrodes of the holder independently of the clamping means.

A further object of this invention is to provide a holder or mounting for piezoelectric crystals in which the crystal is clamped in such a manner that its characteristics are not changed by the clamping method, and yet the crystal may be ground very precisely to some specific frequency without removing it from its clamped holder.

Other and further objects of this invention will be apparent to those skilled in the art to which it relates from the following specification and claims.

Heretofore, it has been the practice in mounting piezoelectric crystal elements, to use the electrodes placed against the crystal surface as the supporting means. This applied primarily to plate type crystals of frequencies from 1500 kc. up. Below 1500 kc., it has been practically impossible to clamp the crystal in any manner without affecting its piezoelectric activity and other characteristics, such as, frequency and temperature coefficient, to a very marked degree. This was true of plate crystals down to 200 kc., and in order to get satisfactory performance from crystals in this frequency range, it was necessary to leave the crystal resting freely on one of the electrodes and with the other electrode separated from the crystal surface by a small air-gap. The movement of the crystal could then be restricted to a relatively small movement, but at best it was still free to move a slight amount, and any disturbance was liable to change the frequency of this type of unit as much as 25 or 30 cycles.

Because of more rigid requirements placed on frequency control devices and particularly for use in frequency modulation service where a slight shift in frequency for a low frequency crystal is multiplied several hundred times, even a small shift of several cycles became very objectionable. Because of the need for absolute frequency stability under conditions of vibration and for portable service, a new type of clamping means was developed. For low frequency crystals where the bar type (20 kc.–400 kc.) is used a method of clamping has been used, but this has disadvantages in that the crystal must be clamped at a nodal point, and even then the piezoelectric properties are affected to some extent by the clamping method. Bar type crystals above 250 kc. cannot be used in this old type clamped mounting because of the excessive damping.

The crystal holder of this invention applies equally well to bars as well as plate type crystals, and the underlying principle is that of using one or more pins which are resonant at the crystal frequency. These pin lengths and diameters are computed for each individual crystal frequency and act like the tines of a tuning fork. The end of the tine touching the crystal surface moves with the crystal whether a longitudinal or a shear mode of vibration is employed and is made of such dimensions as to be resonant at the crystal frequency. The base of the pin acts as a fixed end.

In actual practice in order to obtain "fixed end" conditions for resonant pin, it is simply necessary to increase the diameter at the base of the pin to several times the diameter of the resonant portion. This means that the resonant portion and the adjustable or movable portion of the pin can be constructed out of the same piece of metal.

Further details of this invention are set forth in the following specification and the drawings in which briefly—

Fig. 1 is a top view of one form of piezoelectric crystal holder made in accordance with this invention;

Fig. 2 is a sectional view along the line 2—2 of Fig. 1;

Fig. 3 is a side view of the crystal mounting or holder shown in Fig. 1;

Fig. 4 is a view of one of the electrodes of the holder with three crystal supporting pins arranged to correspond to the corners of a triangle;

Fig. 5 illustrates a slightly modified form of holder made in accordance with this invention;

Fig. 6 is a side view of the holder shown in Fig. 5;

Fig. 7 illustrates the action of one of the supporting pins and is used to facilitate explanation of this invention;

Fig. 7a illustrates the action of a flat ended supporting pin;

Fig. 8 illustrates another form of this invention;

Fig. 9 is a sectional view along the line 9—9 of Fig. 8;

Fig. 10 is a side view of the form of the invention shown in Fig. 8;

Figs. 11 and 12 are detail views of one of the supporting pins;

Fig. 13 illustrates a further modification of this invention;

Fig. 14 is a sectional view taken along the line 14—14 of Fig. 13;

Fig. 15 is an end elevation of the form of the invention shown in Fig. 13;

Fig. 16 is a plan view of one of the electrode and pin holding members showing an electrode that is not adjustable;

Fig. 17 is a side view of the members shown in Fig. 16 and

Figs. 18 and 19 are employed to facilitate explanation of features of this invention.

Referring to Figs. 1, 2 and 3 in detail reference numeral 10 designates a bar type piezoelectric crystal which is clamped between the members 11 and 12 by means of a pair of pins 13 on one side and a pair of pins 14 on the other side. The crystal element 10 is provided with thin coatings 15 and 16 of conducting material which may be applied thereto in various ways, such as, plating, metal spraying, vaporization or sputtering in vacuum and the like. These coatings act as electrodes and form electrical contact with the ends 13a and 14a of the supporting pins which are made of metal. The body portions of the pins 14 are threaded into the plate 12 so that these pins may be screwed against the coating 16 of the crystal. The pins 13 on the other hand are slidably fitted into the plate 11 and a leaf spring 17, adjustably fastened to the plate by the screws 18, 19 is employed to press these pins against the coating 15 of the crystal. Suitable bolts 20 insulated from the plates 11 and 12 by bushings 21 and 23, respectively, are employed for holding these plates against the ends of the insulation bushings 22 so that the crystal 10 may be clamped between said plates by the pins.

The pin 14, having a threaded body portion, is illustrated in greater detail in Figs. 11 and 12 to show the relation between the body portion and the resonant pin section 14a. The length and diameter of the resonant section must be calculated for the particular crystal frequency so as to be resonant to that frequency and the formulae used for this purpose are set forth in detail further in this specification. The end of the resonant section is preferably rounded off as illustrated in Fig. 7 in order to obtain true cantilever action with respect to the fixed body mass during vibration. The pin 13 is also constructed as illustrated in Figs. 11 and 12 except that it is not threaded.

For clamping bar type crystals, it is generally desirable to use two pairs of pins as shown in Figs. 1, 2 and 3 and in this construction the crystal may be clamped at a nodal point. However, this is not necessary since with the resonant pin construction, which is described in detail further in this specification, the crystal may be clamped at points where its vibratory movement is appreciable, and yet the effect of the pins on its performance is negligible. From the standpoint of mechanical considerations rather than from improved electrical performance clamping the crystal along the nodal line is more practical than clamping it at some other point or line.

A three-point clamping, such as shown in Fig. 4, may be used however since this type of support simply provides additional rigidity to the mounting. In this form of the invention one or both of the plates 11—12 are provided with three pins positioned on the corners of the triangle as indicated by the pins 13, Fig. 4. This arrangement has the advantage that the frequency of the crystal may be adjusted without removing it from the holder proper; that is, the holder may be used to hold the crystal while an edge or edges are ground. This may also be done with the holder shown in Figs. 1, 2 and 3 in which the crystal support consists of two pairs of opposing pins although in this case the crystal is not held quite as rigidly and the grinding procedure must be slower.

As was described in a previous paragraph two of the pins 14 shown in Figs. 1, 2 and 3 are made adjustable with respect to the plate 12 by having the larger or body portion of the pin threaded. The opposing two pins 13 slidably engage the upper support 11, and are held against the crystal surface by means of a flat spring 17. The pressure that can be applied to these pins is so high that it is not essential that a spring be used, but it has advantages in that compensation can be made for expansions or contractions in the holder proper. The arrangement shown in Figs. 5 and 6, differs from this construction in that both pairs of pins 13b—14b are threaded so that they can be adjusted for any thickness of crystal. In practice these pins are screwed down into firm engagement with the crystal to clamp it tightly therebetween. This type of holder has the advantage, in that a slight frequency adjustment may be obtained by varying the pressure between the pins. This is true only in cases where the crystal is clamped between the pins at points other than those along a nodal line. In practice the nodal line in a crystal is not very well defined so that it is practically impossible to clamp a crystal along the nodal line deliberately. Consequently even if the crystal is clamped at or near its center as shown in Figs. 1, 2, 3, 5 and 6 there will actually be a slight loading of the crystal and a very small frequency shift. However, since the pin supports are proportioned to vibrate with the crystal they can be used to clamp the crystal sufficiently to increase the internal stress in the crystal because the pressure is concentrated on small areas by the pins.

This same general principle of resonant pin clamping may be applied to plate type crystals as distinguished from the bar type and for this purpose the holders shown in Figs. 8, 9, 10, 13, 14, 15, 16 and 17 are provided. In this type of crystal, the crystal surface again moves in a horizontal plane at the crystal frequency, and if the pin is made resonant at this frequency the crystal will, as far as its piezoelectric activity is concerned, oscillate as though it were practically in free space. In this case the supporting pins 24 and 25, of the same construction as the pin 14 illustrated in Figs. 11 and 12, are supported by the plates 26 and 27, respectively, disposed so that the resonant portions of said pins engage the crystal 28 near its edges.

The plates 26 and 27 of metallic material, are held in spaced relation by four hollow insulation bushings 32 disposed one on each corner. A bolt 33 passes through each of these hollow spacer bushings to hold crystal and mounting apparatus assembled. Insulation bushings 34 and 35 are provided to each of the bolts 33 to insulate these bolts from the end plates 26 and 27 which support the crystal engaging pins 24 and 25, respectively. Adjustable electrodes 29—30 consisting of flat plate sections 36 and 37, respectively, adapted to be adjusted to or away from the crystal faces, are each provided with stems threaded through the supporting plates 26 and 27, respectively. When the electrodes are adjusted to their desired positions they are locked into these positions by the locking nuts 31 and 31a.

Adjustable electrodes are used in this type of mounting, although contiguous surface electrodes could also be used. However, with the plate type of crystal the frequency determining dimension is the thickness, and in grinding such a crystal to frequency, the surface must be ground. This would mean that if it was desired to use a plated electrode, the crystal would have to be plated after it was ground to exact frequency. This is not entirely satisfactory and practical, and consequently separate electrodes are employed, however both of these need not be variable, as illustrated in Figs. 8, 9 and 10, since one or both of the electrodes may be fixed. However, from a practical standpoint, it is desirable to have at least one of the electrodes variable since this enables a slight frequency adjustment to be made and also enables the crystal to be lined up perfectly parallel with the electrodes by means of the adjustable pins.

A further slightly modified form of this invention is illustrated in Figs. 13, 14 and 15 and in this form the end plates 38 and 39 are made of triangular shape with insulation spacer bushings 41 at each corner holding these plates in spaced relation. Bolts 40 are provided at each corner of these plates, insulated from plate 38 by means of the insulation bushings 42, to hold the mounting apparatus and crystal assembled. This holder is similar to that shown in Figs. 8, 9 and 10 in that adjustable electrodes 43 and 44 similar to the adjustable electrodes 29 and 30 are employed. This holder is also similar to that shown in Figs. 1, 2 and 3 in that the supporting pins 45 are slidably mounted in the end plate 38 the same as the supporting pins 13 of Figs. 1, 2 and 3. However the holder shown in Figs. 13, 14 and 15 is specially designed for plate type crystals and the supporting pins 45 and 48 do not function as electrode connections for the crystal 50. In this holder three slidably adjustable pins 45 are provided on one side of the crystal and three pins 48 threaded into the plate 39 are provided on the other side of the crystal. The slidably adjustable pins 45 are backed by a disk 46 of resilient material attached to the plate 38 by screws 47.

The electrodes 43 and 44 may be made integral with or permanently fixed to the end plates as illustrated in Figs. 16 and 17 where the electrode 51 is formed by a raised portion on the plate 52. In this case the electrode 51 may be formed by turning down the surfaces of the plate 52 surrounding this electrode, in a lathe or it may consist of a flat button attached to the plate 52 by means of suitable screws.

It is desirable in the manufacture of the resonant pins to have the end touching the crystal surface of at least one pair or set of the pins slightly rounded, having a hemispherical shape as shown in Fig. 7. This is primarily so that the pin touches the crystal at only one point and the action of the pin as a cantilever is not impeded. The improvement of the rounded pin over the square ended pin is greatest when the diameter is an appreciable part of the length of the resonant portion. When using the bar type holder shown in Fig. 1 with two pins on either side of the crystal, it is desirable to keep the fixed set of pins 13 flat as shown in Fig. 7a and the opposite pins 14 rounded as shown in Fig. 7. This will allow the crystal surface to assume a position perpendicular to the flat pins. When three or more pins are used as shown in Fig. 4, or as shown in the plate type holder, Figs. 8 and 13, it is desirable to have all pins slightly rounded. The effect of this rounding is negligible in computing the resonant length of the pin, and need not enter into the calculation.

In computing the length L of the resonant portion of the pin Fig. 11 for various frequencies, the following must be taken into account. First, whether the section of the pin is square, rectangular, or round; and second, the type of material used. Generally from the manufacturing standpoint, the round section is the most desirable, although I will also give the constants and formula for a square or nearly square section.

According to Rayleigh, in "The Theory of Sound," the resonant frequency of a "clamped-free" bar or cantilever of steel and rectangular cross-section is as follows:

$$F = \frac{84590 T}{L^2}$$

where L = Length of bar in cm.
T = Thickness in plane of vibration in cm.

This assumes approximately square cross-section but holds quite well for reasonably square sections, because the moment of inertia varies as the third power of the thickness and only as the first power of the width (see Figs. 18 and 19).

Den Hartog, in "Mechanical Vibrations," gives for the resonant frequency of a cantilever of clamped-free beam of uniform cross-section, the following equation:

$$W_1 = 3.52 \sqrt{\frac{EI}{u_1 L^4}} \qquad (1)$$

where $W_1$ = Frequency in radians/sec. = $2\pi F$.
E = Young modulus in dynes/sq. cm.
I = Moment of inertia.
$u_1$ = Mass/unit length = area, times density or specific gravity (A×D).
F = Frequency in cycles/sec.

$$F = \frac{3.52}{2\pi} \sqrt{\frac{EI}{u_1 L^4}} \qquad (2)$$

It can be seen from this equation that the frequency varies as the square root of the moment of inertia, and we can obtain an equation similar to (1) which applies to a round section by multiplying our constant 84,590 by the ratio of the square root of the moment of inertia of a round section to the square root of the moment of inertia of a square section.

By using Den Hartog's equation, we can also develop an equation in terms of a constant, the thickness of the section, the length of the bar, the modulus of elasticity, and the density or specific gravity. Substituting in (2) the value of $u_1$, we get:

$$F = \frac{.163T}{L^2}\sqrt{\frac{E}{D}} \qquad (3)$$

and substituting representative values for steel of E and D, $E = 20 \times 10^{11}$ dynes/sq. cm., and $D=8$, we get $$F = \frac{81000T}{L^2}$$

This checks quite well with the Rayleigh equation.

Doing this same thing for a round section, we get:

$$F = \frac{.140d}{L^2}\sqrt{\frac{E}{D}} \qquad (4)$$

and again substituting values for E and D, we get $$F = \frac{70{,}000d}{L^2}$$

for a round section.

From these equations we can compute the length of pin required to be resonant at any frequency F. The thickness T or diameter $d$ can be fixed at some value which is reasonable for manufacture, but should be as small as possible, consistent with good rigidity so as to have "clamped free" bar conditions. T, $d$, and L are given in cm. when F is in cycles/sec. and E in dynes/sq. cm.

As an example of the use of these equations, we will compute the length of pin required for a 433,000 cycles/sec. crystal. Assuming a round pin of steel and a diameter of .050 cm., $$F = \frac{70{,}000\,(.05)}{L^2}$$

$$L^2 = \frac{70{,}000\,(.05)}{433{,}000} = .0081$$

$$L = .09 \text{ cm.}$$

By using Equations 3 and 4, the required length may be computed for either round or square sections for any material by substituting the required values for E and D. These equations have been checked experimentally, and have been found to work well with both the plate and bar type crystals.

All of the above equations are given for the first natural mode of vibration of a cantilever. In some instances, it may be desirable to use the second or even the third mode of vibration for the higher frequencies to get a longer and more practical size of resonant pin. Under conditions of second mode vibration the constant in Equation 1, according to Den Hartog, becomes 22, and the constant in the frequency Equation 3 becomes 1.02, and in Equation 4 becomes .875. Since the constant in the frequency equation is multiplied approximately 6.25 times, the length of a pin vibrating in the second mode will be the square root of 6.25, or approximately 2½ times as long as if it were going on the fundamental mode. This, of course, is assuming the same thickness. The third or higher modes may be used if because of the frequency involved, the length of pin is not sufficient for practical manufacture.

I have found in practice that this resonant pin support may be used both with crystals vibrating in the longitudinal mode and the shear mode.

In practicing this invention it is obvious that the supporting pins 13 and 14 may be made with the resonant sections 13a and 14a respectively threaded axially through the body portions of the pins 13 and 14 so that the exposed resonant sections thereof may be conveniently adjusted and these portions may be made of a harder material than that out of which the body portion is made. Furthermore these resonant pins may be used to support the crystal along the edges if desired or they may be threaded into or formed integral with the electrodes in cases where the electrodes are fixed as in Figs. 16 and 17.

Various other modifications of this invention may be made without departing from the spirit and scope thereof and therefore I do not desire to limit this invention to the exact details illustrated and described, except as these details may be defined in the claims.

What I claim is as follows:

1. Piezoelectric crystal apparatus, comprising: a piezoelectric crystal, and means resonant substantially to the frequency of oscillation of said piezoelectric crystal for supporting said crystal.

2. Piezoelectric crystal apparatus, comprising: a piezoelectric crystal, and means resonant substantially to the frequency of oscillation of said crystal for mechanically clamping and supporting said crystal.

3. Piezoelectric crystal apparatus, comprising: a piezoelectric crystal, means for supporting said crystal consisting of a plurality of pins clamping said crystal therebetween, each of said pins having a relatively thin portion engaging said crystal at one end thereof and mechanically resonant to the frequency of oscillation of said crystal.

4. Piezoelectric crystal apparatus, comprising: a piezoelectric crystal, means for supporting said crystal consisting of a pair of plates and a plurality of pins supported by said plates for clamping said crystal therebetween, each of said pins having a relatively thin portion engaging said crystal at one end thereof and mechanically resonant to the frequency of oscillation of said crystal.

5. Piezoelectric crystal apparatus, comprising: a piezoelectric crystal, means for supporting said crystal consisting of a plurality of pins clamping said crystal near edges of its major faces, each of said pins having a relatively thin portion engaging said crystal at one end thereof and mechanically resonant to the frequency of oscillation of said crystal.

6. Piezoelectric crystal apparatus, comprising: a piezoelectric crystal, means for supporting said crystal consisting of a plurality of pins clamping said crystal near edges of its major faces, each of said pins having a relatively thin portion engaging said crystal at one end thereof and mechanically resonant to the frequency of oscillation of said crystal and a pair of electrodes positioned adjacent to the major faces of said crystal and between said pins.

7. Piezoelectric crystal apparatus, comprising: a piezoelectric crystal, a holder for said crystal including a pair of plates, means for holding said plates in spaced relation and means for clamping said crystal between said plates including a plurality of pins each having a section of relatively small cross-section resonant to the frequency of oscillation of said crystal.

8. Piezoelectric crystal apparatus, comprising:

a piezoelectric crystal, a holder for said crystal including a pair of plates, means for holding said plates in spaced relation and means for clamping said crystal between said plates including a plurality of pins each having a section of relatively small cross-section resonant to the frequency of oscillation of said crystal, said pins engaging said crystal adjacent edges thereof, and a pair of electrodes for the major faces of said crystal positioned between said pins.

9. Piezoelectric crystal apparatus, comprising: a piezoelectric crystal, a holder for said crystal including a pair of plates, insulation bushings for holding said plates in spaced relation and means for clamping said crystal between said plates including a plurality of pins supported by each of said plates, each of said pins having a section of relatively small cross-section resonant to the frequency of oscillation of said crystal.

10. Piezoelectric crystal apparatus, comprising: a piezoelectric crystal, a holder for said crystal including a pair of plates, means for holding said plates in spaced relation and means for clamping said crystal between said plates including a plurality of pins supported by each of said plates, each of said pins having a relatively large body section adapted to engage the corresponding supporting plate and a section of relatively small cross-section resonant to the frequency of oscillation of said crystal.

11. Piezoelectric crystal apparatus, comprising: a piezoelectric crystal having a pair of major faces, a pair of electrodes for said crystal disposed adjacent to said major faces, one of said electrodes having means to adjust it with respect to the corresponding crystal face, a plurality of pins for engaging and clamping said crystal therebetween, said pins each having a section of relatively small cross-section resonant to the frequency of oscillation of said crystal.

12. Piezoelectric crystal apparatus, comprising: a piezoelectric crystal having a pair of major faces, a pair of plates, insulation bushings for spacing said plates, a pair of electrodes for said crystal disposed adjacent to said major faces, means for supporting said electrodes on said plates, said last means consisting of means for adjusting at least one of said electrodes, a plurality of pins for engaging and clamping said crystal therebetween, said pins each having a section of relatively small cross-section resonant to the frequency of oscillation of said crystal.

13. Piezoelectric crystal apparatus, comprising: a piezoelectric crystal, a plurality of pins for engaging said crystal on each side and clamping said crystal therebetween, said pins each having a section of relatively small cross-section resonant to the frequency of oscillation of said crystal, said pins on one side of said crystal having means for adjustment thereof with respect to said crystal to vary the pressure exerted thereon.

14. Piezoelectric crystal apparatus, comprising: a piezoelectric crystal, a plurality of pins for engaging and clamping said crystal therebetween, said pins each having a section of relatively small cross-section resonant to the frequency of oscillation of said crystal for engaging said crystal and vibrating with said crystal.

15. Piezoelectric crystal apparatus, comprising: a piezoelectric crystal having a pair of major faces, a pair of electrodes one for each of said major faces, means for holding said electrodes together in spaced relation and insulated from each other, and a plurality of pins resonant to the frequency of oscillation of said crystal for engaging said crystal and supporting it between said electrodes.

16. Piezoelectric crystal apparatus, comprising: a piezoelectric crystal having a pair of major faces, a pair of electrodes one for each of said major faces, each of said electrodes having a substantially flat portion adjacent to the corresponding crystal face and a threaded stem, a pair of plates for supporting said electrodes, said electrode stems being threaded into said plates, a plurality of pins having portions of relatively small cross-section resonant to the frequency of oscillation of said crystal, said resonant portions of said pins engaging and supporting said crystal.

17. Piezoelectric crystal apparatus, comprising: a piezoelectric crystal, and means resonant substantially to a harmonic of the frequency of oscillation of said piezoelectric crystal for supporting said crystal.

18. Piezoelectric crystal apparatus, comprising: a piezoelectric crystal, and means resonant substantially to a harmonic of the frequency of oscillation of said crystal for mechanically clamping and supporting said crystal.

19. Piezoelectric crystal apparatus, comprising: a piezoelectric crystal, and means having a resonant frequency substantially harmonically related to a frequency of oscillation of said crystal for supporting said crystal.

20. Piezoelectric crystal apparatus, comprising: a piezoelectric crystal, and means having a resonant frequency substantially harmonically related to a frequency of oscillation of said crystal for mechanically clamping and supporting said crystal.

JOHN M. WOLFSKILL.